INVENTORS
FRANCIS A. GOPLEN
GERALD R. WILLIS

BY *Donald F. Voss*

ATTORNEY

United States Patent Office 3,343,559
Patented Sept. 26, 1967

3,343,559
APPARATUS FOR CONTROLLING CHANGES IN AIR PRESSURE IN AN UNKNOWN VOLUME AND PRESSURE AIR SYSTEM
Francis A. Gopien, Zumbrota, and Gerald R. Willis, Rochester, Minn., assignors to International Business Machines Corporation, New York, N.Y., a corporation of New York
Filed Sept. 14, 1964, Ser. No. 396,086
2 Claims. (Cl. 137—109)

This invention relates to control apparatus for controlling changes in air pressure in an air pressure system of unknown variable volume and pressure and more particularly to such control apparatus which enables the detection of air pressure pulses produced in the air pressure system by modulating forces acting thereupon.

This invention finds particular utility in blood pressure measuring devices where the volume and pressure of air in the occluding cuff are unknown and variable. In order to recognize a change in air pressure in the occluding cuff due to heartbeat, the pressure change rate must be maintained at a constant value. However, since the volume and pressure are both variable, a fixed orifice will not control the change in air pressure at a constant rate.

In this invention, a variable size orifice provides the control whereby the air pressure changes takes place at a constant rate and still enables the detection of air pulses produced in the air system. The variable size control orifice is derived or achieved through the facility of a diaphragm which is subjected to a known variable control pressure changing at a constant rate. Of course, the control pressure could be varied so as to change at a non-linear rate if this were desired.

This variable control pressure applied to the diaphragm could be achieved in many ways and in a preferred embodiment it is developed from a constant volume air system regulated so as to provide a change in pressure at a constant rate. The controlled air pressure changing at the constant rate from the first constant volume system is applied to one side of the diaphragm controlling the size of the orifice. The air under pressure in the second or unknown variable volume system is applied to the other side of the diaphragm. As the air pressure in the first system changes at the constant rate, the air under pressure from the second system passes or bleeds through the variable size orifice whereby the air pressure in the second system changes at the same constant rate of the first air system. The air pressure of the second system can be caused to follow the air pressure of the first system very closely. However, a differential in pressure between the two can be created by biasing the diaphragm controlling the size of the orifice. In any event, the important consideration is that the air pressure of the second system changes at a constant rate.

Because the volume of air in the second or working system is variable, due to the elastic deformation of the inflatable air cuff, it is not feasible to attempt to change the air pressure of the second system by controlling the change in volume of the first or control air system. This is particularly true if the volume of the working air system is substantially of the same magnitude as that of the control air system.

Accordingly, a prime object of this invention is to provide improved apparatus for controlling the change in air pressure of a variable volume and pressure air system.

A more specific but important object of this invention is to provide improved apparatus for controlling the change in air pressure of a variable volume and pressure air system at a constant rate.

Another very important object of the invention is to provide a variable size orifice for controlling changes in air pressure at a constant rate where the effective size of the orifice is governed by a diaphragm.

Still another important and more specific object of this invention is to apply variable pressure to a diaphragm to vary the effective size of an orifice connected to an air system whereby the air pressure in said air system changes at a controlled rate.

Yet another specific object of the invention is to provide a first air system of a known constant volume, which is changing in pressure at a constant rate, to control changes in air pressure at a constant rate of a second air system of an unknown variable volume.

Still another specific object of the invention is to provide improved control apparatus for controlling changes in air pressure at a constant rate which is relatively inexpensive.

The foregoing and other objects, features and advantages of the invention will be apparent from the following more particular description of a preferred embodiment of the invention, as illustrated in the accompanying drawings.

Figure 1:
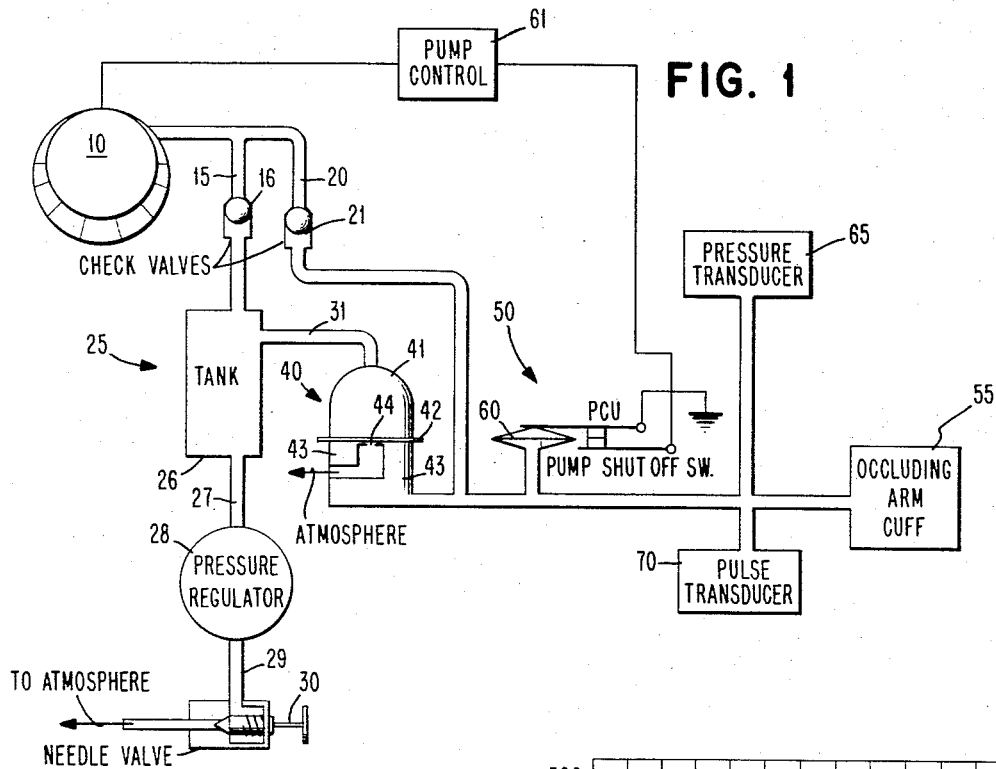
FIG. 1 is a schematic block diagram of the control and working air systems where the working air system is incorporated into a blood pressure measuring system.

With reference to the drawings, and particularly to FIG. 1, the invention is illustrated by way of example as including a pump 10 for compressing air. The pump 10 can be any suitable pump of types well known in the art for pressurizing air. The output of the pump 10 is connected by suitable conductors 15 and 20 to control air system 25 and working air system 50 respectively via check valves 16 and 21 respectively.

The control air system 25 includes a tank 26 which is of a fixed or constant volume. An air line or conductor 27 is connected between tank 26 and pressure regulator 28. The pressure regulator 28 is connected by air conductor 29 to needle valve 30 which in turn discharges to the atmosphere. By means of the pressure regulator 28 and needle valve 30, the air pressure in tank 26 can be caused to decrease at a constant rate. The pressure regulator 28 controls the amount of decrease in air pressure while the needle valve controls the rate in the decrease of pressure. Hence, control system 25 is a constant volume air system regulated whereby the air pressure decreases at a constant rate by bleeding down through a fixed adjustable orifice with a fixed pressure differential across the fixed orifice.

The air under pressure in tank 26 is used to control the air pressure in air system 50. Air pressure in tank 26 is supplied to an upper chamber 41 of control valve 40 via air conductor 31. Control valve 40 schematically shown in FIG. 1 includes a diaphragm 42 separating upper chamber 41 from lower chamber 43 and effectively controlling the size of orifice 44 which communicates lower chamber 43 with the atmosphere. The lower chamber 43 is connected to the second air system 50.

In this particular example, the second air system 50 constitutes a portion of a blood pressure measuring system. It includes an occluding arm cuff 55 of the type well known in the art. The arm cuff 55 is connected to be pressurized by pump 10. In the particular blood pressure measuring system, the occluding cuff 55 is wrapped about a patient's arm and is then pressurized to a predetermined pressure. A bellows-type actuator opens normally closed pump control contacts PCC when the occluding arm cuff 55 reaches the predetermined pressure. This causes the pump to stop operating. The pump control contacts PCC lead to a pump control unit 61, which controls the operation of the pump 10. The pump control unit merely includes switches for further controlling the operation of the pump 10.

A pressure transducer 65 is connected to the pump 10 in parallel with the occluding arm cuff 55. The air pressure transducer 65 is a strain gage type of transducer well known in the art and it provides an electrical signal indicative of the air pressure to the blood pressure measuring system as of the type shown and described in U.S. patent application Ser. No. 347,212, filed Feb. 25, 1964, for Physiological Monitoring System, by F. Anderholm et al. and assigned to the same assignee as the present invention. The pulse transducer 70 is connected in the air system 50 in the same manner as occluding arm cuff 55 and air pressure transducer 65. The air pulse transducer 70 is of the type shown and described on page 57 of the IBM Technical Disclosure Bulletin, vol. 6, No. 7, dated December 1963. It should be noted that pressure transducer 65 and pulse transducer 70 do not form a part of the present invention; however, they are included because they are in the blood pressure measuring system incorporating the present invention.

When pump 10 is started by pump control 61, it furnishes air under pressure to air systems 25 and 50 respectively. When the air in system 50 reaches a predetermined pressure as determined by control 60, the contacts PCC open and the pump 10 is shut off. Check valves 16 and 21 close and thereby prevent any pressure loss through the pump 10. While FIG. 1 shows the pump 10 to be common to both air systems 25 and 50, this arrangement is not necessary to the invention. The air systems 25 and 50 could be connected to receive air under pressure from separate sources. Further, the air systems 25 and 50 could be initially pressurized to different predetermined amounts if it were so desired.

Figure 2:
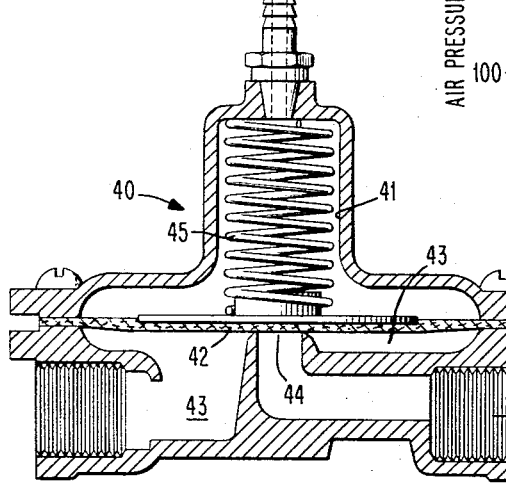
FIG. 2 is a sectional view of the variable orifice air bleed-off control valve; and, FIG. 3 is a diagram showing control and following working air pressure versus time.
Figure 3:
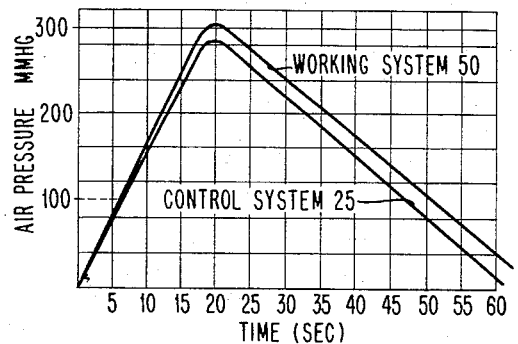

In this particular example, the air under pressure in tank 26 is reduced at the rate of approximately 5 mm. Hg/second. The rate of decrease in air pressure in tank 26 of course is controllable by needle valve 30. The air pressure in tank 26 works against the diaphragm 42 in control valve 40 whereby diaphragm 42 controls the effective size of orifice 44. The air under pressure in the occluding arm cuff 55 enters chamber 43 and escapes through the orifice 44 to the atmosphere. The air under pressure in arm cuff 55 decreases at a constant rate as controlled by the decreasing air pressure in tank 26. As seen in FIG. 2, the diaphragm 42 is biased against orifice 44 by a spring 45. The spring 45 lightly places a pressure upon the diaphragm 42 so as to keep diaphragm 42 against the orifice 44 as the air systems 25 and 50 are initially pressurized. Hence, although the air under pressure in arm cuff 55 decreases at a constant rate, the pressure in cuff 55 will be slightly higher than that in tank 26 when a spring or other biasing member is utilized to bias the diaphragm 42 against the orifice 44. FIG. 3 illustrates the change in air pressure for systems 25 and 50.

The control valve 40 is shown in greater detail in FIG. 2. When incorporating the present invention into a blood pressure measuring system, it was found that the response time of the diaphragm 42 should be kept slow so as not to eliminate air pulses superimposed on the decreasing air pressure in the occluding arm cuff 55. A multi-layer rubber diaphragm proved to be quite suitable.

From the foregoing it is seen that the invention provides apparatus for controlling the reduction of air pressure at a constant rate in a variable volume air pressure system. Further, it is seen that a first air system of a known and fixed volume provided a constant change in air pressure to a control device connected to an air system of a variable volume.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In an air pressure control system:
   a control air system consisting of an air tank having a fixed volume, means for pressurizing said air tank to a predetermined air pressure, and means for bleeding the air pressure from said tank at a constant rate including a constant flow valve connected to said tank to control the amount of decrease in air pressure and a needle valve connected in series with said constant flow valve to control the rate of decrease in air pressure;
   a working air system consisting of a variable volume inflatable and deflatable air device, means for inflating said air device to a predetermined air pressure, and means for deflating said variable volume device including a control valve having first and second chambers with a diaphragm separating said first chamber from said second chamber and an orifice communicating said second chamber with the atmosphere, the effective size of said orifice being controlled by said diaphragm, said first chamber being connected to said air tank and said second chamber being connected to said air device whereby as pressure decreases in said control air system at a constant rate, the effective size of said orifice is varied by said diaphragm to vary correspondingly the decreasing air pressure of said working air system at a constant rate.

2. The air pressure control system of claim 1 further comprising:
   a spring positioned within said first chamber to urge said diaphragm in pressure contact with said orifice.

References Cited

UNITED STATES PATENTS

| 697,680 | 4/1902 | Singer | 137—510 |
| 2,329,323 | 9/1943 | Benz | 137—510 X |
| 2,622,610 | 12/1952 | Rowe | 137—100 |
| 2,902,048 | 9/1959 | Ryan | 137—510 |
| 3,104,661 | 9/1963 | Halpern | 128—2.05 |
| 3,236,230 | 2/1966 | Follett | 128—2.05 |

WILLIAM F. O'DEA, *Primary Examiner.*

H. W. WEAKLEY, *Assistant Examiner.*